United States Patent [19]

Smith

[11] 4,165,735
[45] Aug. 28, 1979

[54] SOLAR ENERGY COLLECTOR AND STORAGE DEVICE

[76] Inventor: Harold T. Smith, 5623 Fillmore St., Hollywood, Fla. 33021

[21] Appl. No.: 844,452

[22] Filed: Oct. 25, 1977

[51] Int. Cl.² ............................................. F24J 3/02
[52] U.S. Cl. .................................. 126/437; 126/447
[58] Field of Search ................ 126/270, 271; 237/1 A

[56] References Cited

U.S. PATENT DOCUMENTS

| 4,048,981 | 9/1977 | Hobbs | 126/271 |
| 4,084,578 | 4/1978 | Ishibashi | 126/271 |

*Primary Examiner*—Kenneth W. Sprague
*Attorney, Agent, or Firm*—Malin & Haley

[57] ABSTRACT

An improved flat plate solar energy collector of integral construction capable of mass production in which metal tubing is eliminated. The collector includes a stamped planar tray and a radiant energy absorber plate connected together to form the inlet and outlet fluid header and the innerconnecting channels therebetween. The planar tray and absorber plate are mounted in a molded insulated housing which includes integrally a storage tank. A fluid medium such as water is heated by solar radiation and circulated through the collector to the storage tank by thermal syphon. Elimination of conventional tubing greatly reduces fabrication costs and increases absorption efficiency.

2 Claims, 4 Drawing Figures

4,165,735

SOLAR ENERGY COLLECTOR AND STORAGE DEVICE

BACKGROUND OF THE INVENTION

This invention relates generally to a device that collects the radiant energy of the sun by heating a fluid medium, such as water, and storing the energy in the form of heated water. The prior art shows a plethora of fluid actuated, solar collector devices which employ a thermally conductive tubing such as copper as the radiant energy absorption coil. One of the great drawbacks found in prior art collectors is that the tubing array is not suited to mass production fabrication techniques which greatly increases the individual per unit cost. Another deficiency of the prior art collectors is that the circular or square tubing is not the most efficient thermal absorption element for the solar radiant energy source. Prior art collectors of plastic materials were oftentimes unable to withstand normal pressures.

The present invention greatly reduces collector fabrication costs, eliminates the use of costly metal tubing, and allows for withstanding of conventional water pressures. The present invention utilizes a planar tray (which may be formed by stamping) joined to a radiant energy absorption plate to form a fluid receptacle having a plurality of separated but parallel fluid channels, each of said channels being in fluid communication with inlet and outlet headers. The present invention also improves thermal efficiency due to the shape of the fluid bearing channels and headers and an insulated housing for both the tray and the storage tank.

BRIEF DESCRIPTION OF THE INVENTION

An improved solar energy collector which uses a fluid medium, such as water, for absorbing solar radiation energy comprising a planar shaped stamped tray having spaced ridges that act as channel dividers and recessed inlet and outlet fluid headers, a thermally conductive absorption plate affixed to the ridged channel dividers, an insulated casing to which said plate and tray are affixed, and a transparent glass cover disposed above said absorption plate connected to said casing. The casing includes a thermally insulated upper end having an embedded fluid storage tank integrally formed therewith for receiving the fluid medium and first and second conduits connected to the inlet header, the outlet header and the storage tank. In operation, the collector is mounted in an appropriate area to receive the sun's radiation and is disposed essentially at a predetermined angle on the roof of a dwelling or the like relative to the horizontal. Fluid circulation between collector and storage tank is achieved by a thermal syphon. The water or other fluid medium, as warmed, rises within the intermediate channels to the top header where it then siphons into the storage tank while at the same time, the colder water which is at the bottom of the storage tank flows into the bottom header in the collector.

The insulation casing is disposed about the sides and bottom of the device and may be of a preformed insulation, such as styrofoam or the like.

The transparent glass covering is utilized to provide further insulation between the top of the absorber plate which is constructed of a thermally conductive metal to prevent loss of heat by conductivity out of the absorption plate. In one particular embodiment, the device is rectangular in shape and includes a bottom (inlet) header that receives the cold water and a top (outlet) header that discharges the warmed water. A plurality of intermediate vertical channels connect the headers together. Each channel that transports the fluid medium is substantially rectangular in cross-sectional shape, giving a large fluid contact area for receiving the radiation of the sun. The headers and channel ridges are formed in the tray when the tray is stamped, pressed, molded or otherwise formed.

It is an object of this invention to provide an improved solar radiation energy collector that is readily massed produced having reduced fabrication costs by eliminating metal tubing.

It is another object of this invention to provide an improved solar energy collector that has increased thermal efficiency and insulative characteristics.

And yet another object of this invention is to provide an improved solar energy collector which has greatly improved fabrication efficiency and is easily mounted on a roof structure.

In accordance with these and other objects which will be apparent hereinafter, the instant invention will now be described with particular reference to the accompanying drawings.

PREFERRED EMBODIMENT OF THE INVENTION

Figure 1:
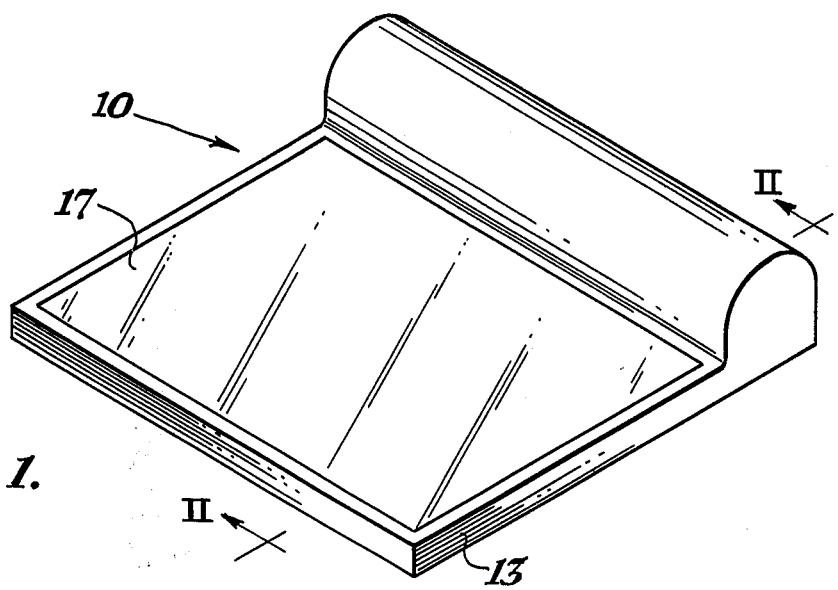
FIG. 1 shows perspective view of the instant invention.
Figure 2:
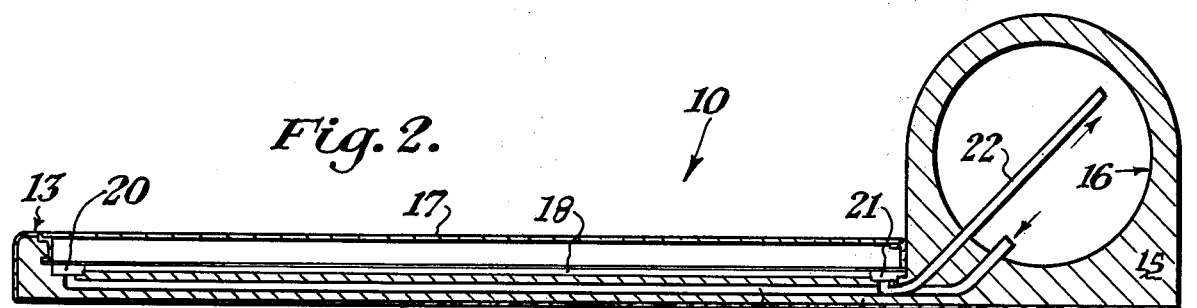
FIG. 2 shows a side elevational view in cross-section of the instant invention.

Referring now to the drawings and specifically FIGS. 1 and 2, the instant invention is shown generally at 10 comprised of a molded rigid casing 13 disposed along the bottom and sides for housing a preformed insulation bed 14 mounted within the casing 13. The insulation bed 14 extends the entire length of the device and includes a fluid storage tank area 15 disposed at one end, the storage tank 16 being embedded in the insulation. Disposed within the central embedded portion of the insulation is a rectangular, planar tray 18 having two preformed recessed end channels 20 and 21 (at opposite ends) which act as inlet and outlet headers for the heated fluid. The headers 20 and 21 are in fluid communication with the storage tank 16 via conduits 19 and 22. A glass transparent cover insulates the tray and absorption plate from the atmosphere.

Figure 3:
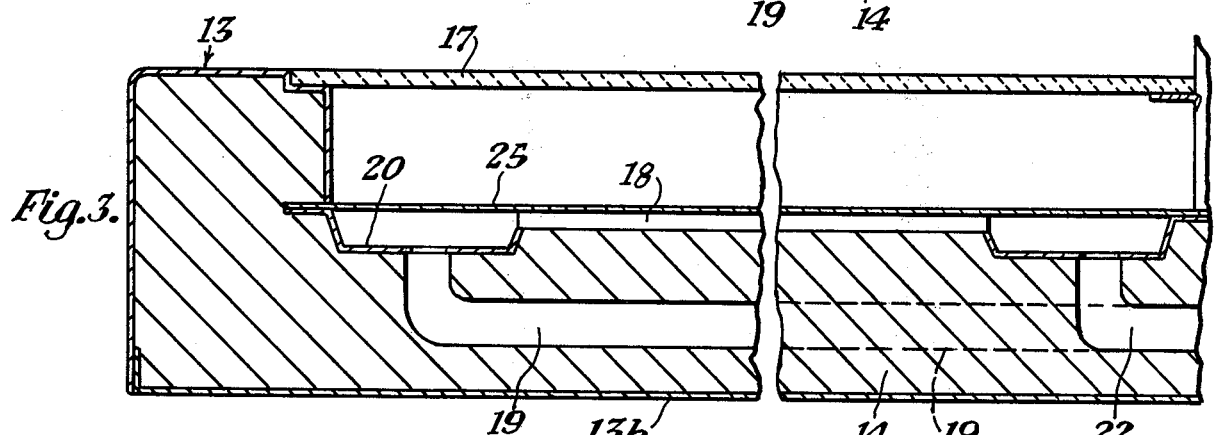
FIG. 3 shows a fragmentary front elevational view in cross-section of the instant invention.

Referring now to FIG. 3, casing 13 is shown housing foam insulation 14 which is pre-molded to receive the collector tray 18. At one end the tray includes a recessed channel 20 which runs the lateral width of the tray and is in fluid communication from the tank and be received into the recessed end channel 20 which acts as an inlet header for the cold water. The absorber plate 25 is connected to the tray 18 along ridges 23 which have been preformed in the tray 18. The absorber plate 25 is constructed of a thermally conductive material such as a suitable metal and receives a solar radiation through the glass cover 17 mounted on lip 13c of casing 13. At the opposite end of the collector (near the storage tank), the tray includes a second recessed channel 21 laterally disposed across the collector which acts as the outlet header for the heated water which rises by thermal syphon from the bottom of the collector to channel 21 and into the tank through conduit 22.

Figure 4:
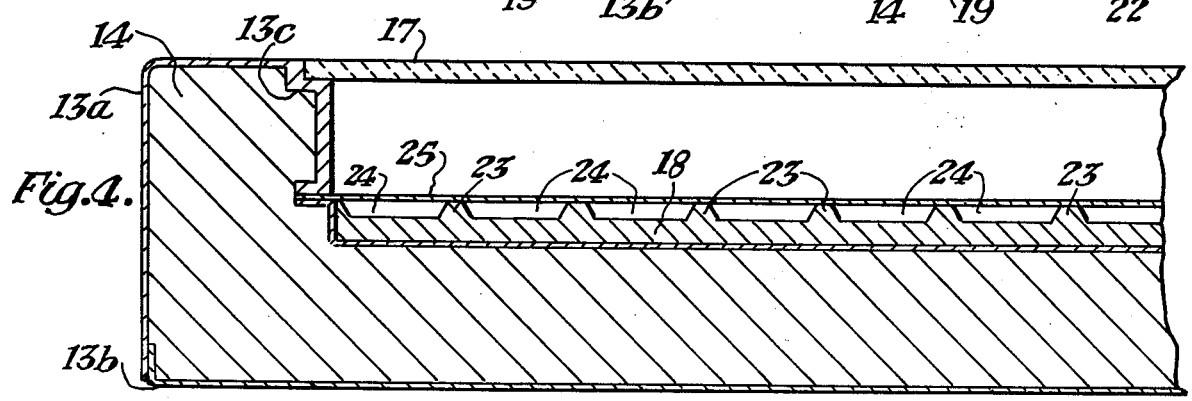
FIG. 4 shows a fragmentary side elevational view in cross-section of the instant invention.

FIG. 4 shows intermediate channels 24 which are formed in the plate 18 by a plurality of raised ridges 23 integrally formed in the construction of the plate 18. Each channel 24 holds water that is heated by radiant solar energy which strikes the absorber plate 25 in contact with fluid in the channels 24. The channels 24 direct movement of the fluid from the inlet header 20 across the collector through the outlet header 21. The absorber plate 25 is connected to the plate 18 along the ridge portions by welding or other conventional techniques.

The insulation 14 acts as a supporting bed for the plate and as insulation for the conduits 19 and 22 to provide increased thermal efficiency of the collector. Thus the insulation bed 14 has a pre-molded shape which is contoured to allow the plate 18 to be received and housed therein.

In operation the device may be mounted in any suitable area or on a building roof disposed at an appropriate angle to receive a maximum solar radiation intensity. The use of a metal absorber plate and tray allows for system pressures to be employed without danger of rupture, while relying on thermal syphon principles for circulation of the fluid medium into and out of the storage tank. Once the heated fluid is in the storage tank, appropriate conventional techniques for transfer of the fluid into conventional water systems may be utilized.

To fabricate the device, the tray is bonded by resistance welding, silver solder, etc., to the absorption plate and mounted in the insulation. Thus, the fabrication of the system components individually and the entire system may employ mass production techniques.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A solar energy collector using a fluid medium for absorbing solar radiation energy, comprising:
   a housing,
   a first conduit;
   a second conduit;
   a planar tray;
   a fluid storage tank;
   an integrally formed thermal insulation bed connected to said housing, said integrally formed thermal insulation bed including a recessed area for receiving a planar tray, said firat conduit and said second conduit disposed within a portion of said insulation bed;
   said insulation bed including a preformed, molded, hollow insulation portion sized to encompass said fluid storage tank, said fluid bank mounted in said insulation;
   said planar tray having a plurality of recessed areas disposed therein mounted within said recessed portion of said thermal insulation bed;
   a thermally conductive absorber plate mounted on the top of said tray, said absorber plate and said recessed portions on said tray forming a plurality of channels;
   a first header formed in said tray connected at one end in fluid communication with said channels formed in said tray, a second header formed in said tray disposed at the opposite end connected in fluid communication with said channels, said first conduit connected between said tank and said first header, and said second conduit connected between said second header and said tank.

2. A solar collector as in claim 1, including:
   a transparent plate connected to said housing and disposed over said absorption plate whereby solar radiant energy is received through said transparent shield onto said absorber plate.